United States Patent [19]

Anderson

[11] Patent Number: 5,004,710

[45] Date of Patent: Apr. 2, 1991

[54] METHOD FOR THE CHEMICAL PREPARATION OF ZIRCONIA ALLOY POWDERS AND ARTICLE

[75] Inventor: Michael P. Anderson, Gillette, N.J.

[73] Assignee: Exxon Research and Engineering Company, Florham Park, N.J.

[21] Appl. No.: 59,504

[22] Filed: Jun. 8, 1987

[51] Int. Cl.$^5$ .............................................. C04B 35/48
[52] U.S. Cl. .................... 501/103; 501/105; 501/127; 501/153; 423/600; 423/608
[58] Field of Search ...................... 423/600, 608, 629; 501/103, 127, 105, 153, 127

[56] References Cited

U.S. PATENT DOCUMENTS

| | | | |
|---|---|---|---|
| 4,587,225 | 5/1986 | Tsukuma et al. | 501/153 X |
| 4,605,631 | 8/1986 | Rossi | 423/608 X |
| 4,639,356 | 1/1987 | O'Toole et al. | 423/608 X |
| 4,664,894 | 5/1987 | Suzuki et al. | 423/608 X |
| 4,665,040 | 5/1987 | Kurita | 501/105 D |

FOREIGN PATENT DOCUMENTS

| | | | |
|---|---|---|---|
| 0191125 | 8/1986 | European Pat. Off. | 501/103 |
| 3445948 | 7/1985 | Fed. Rep. of Germany | 501/105 |

*Primary Examiner*—Karl Group

*Attorney, Agent, or Firm*—Joseph J. Dvorak

[57] ABSTRACT

A ceramic article having good fractured toughness comprising substantially spherical ceramic particles, which may be a ceramic oxide such as zirconia or zirconia combined with yttrium oxide. The ceramic particles are compacted and sintered to a density greater than 90 percent of theoretical density. The article is characterized by a substantially uniform chemical composition and a substantially inclusion-free, homogeneous microstructure, which may be a metastable crystalline phase with less than 10 volume percent monoclinic crystalline phase. The article is produced by dissolving, such as in water, a soluble compound containing a metal, e.g. zirconium, to form a solute. A precipitation agent, such as sodium hydroxide or ammonium hydroxide, is combined with the solute to precipitate a hydrophilic colloid of the metal hydroxide, such as zirconium hydroxide. The precipitate is formed into particles which are rapidly solidified while preventing agglomeration thereof. The particles are dried, compressed to increase density and reduce size, calcined to convert the metal hydroxide to oxide, e.g. zirconium oxide, and then the particles are compacted and sintered to form a dense ceramic article.

19 Claims, No Drawings

METHOD FOR THE CHEMICAL PREPARATION OF ZIRCONIA ALLOY POWDERS AND ARTICLE

BACKGROUND OF THE INVENTION

1. Field of the Invention

The present invention relates to zirconia ceramic articles and to a method for manufacturing the same.

2. Description of the Prior Art

It is known to use zirconia ceramic articles for various applications requiring strength or wear resistance at elevated temperatures. Specifically, zirconia ceramics comprising mainly zirconia ($ZrO_2$) and yttrium oxide ($Y_2O_3$) are conventionally used for this purpose.

In the use of zirconia ceramic articles of this type, it is important that the article be resistant to cracking, particularly in the presence of thermal shock to which these articles are typically subjected in high temperature applications. With conventional zirconia ceramic articles, a major source of crack initiation results from microstructural heterogeneities, which may be in the form of inclusions resulting during production of the particulate material from which the article is produced. Specifically, inclusions and impurities are produced in the particle mass during conventional ball milling. Incident to the manufacture of ceramic articles the material is ball milled to achieve fine particle size prior to compacting and sintering to achieve the desired dense article.

In addition, crack initiation may result from chemical inhomogeneity resulting from incomplete diffusion and large crystal size caused by prolonged sintering times at elevated temperature required to achieve complete sintering.

Resistance to crack propagation may be achieved in ceramic articles of this type by providing an increased content of metastable tetragonal crystalline phase. During conventional preparation of these ceramic articles, however, significant transformation of the this desirable metastable phase to the monoclinic phase occurs. This results in decreased resistance to crack propagation.

SUMMARY OF THE INVENTION

It is accordingly a primary object of the present invention to provide a ceramic article and a method for producing the same wherein the article is characterized by good fracture toughness.

A more specific object of the invention is to provide a method and article of this type wherein a microstructure is produced that is resistant to crack initiation and crack propagation, particularly during thermal cycling.

Additional objects and advantages of the present invention will be set forth in part in the description that follows and in part will be obvious from the description or may be learned by practice of the invention. The objects and advantages of the invention may be realized and obtained by the method particularly pointed out in the appended claims.

In accordance with the invention a solution, preferably an aqueous solution, of a compound of a metal suitable for forming a ceramic oxide is provided. The metal is precipitated from the solution in the form of a hydrophilic colloid of metal hydroxide. Particles are formed from the metal hydroxide, and the particles are calcined to convert the hydroxide to a ceramic oxide. The calcined particles are compacted and sintered to form a dense article. The compound may be a soluble compound of a nitrate, chloride, oxyitride or oxychloride of metals such as zirconium, aluminum, magnesium and yttrium. The solution is combined with a precipitation agent, which may be an alkali metal hydroxide or other hydroxide, preferably ammonium hydroxide, to produce a precipitate of the hydroxide of the metal. Particles are formed from the precipitate, and the particles are rapidly solidified while preventing agglomeration thereof. This may be achieved by the use of a cryogenic liquid, such as liquid nitrogen, as a quenching medium. After drying, the particles are compressed to increase the particle density and reduce particle size. The particles are calcined to convert the hydroxide to a ceramic oxide of the metal. The particles are then ready for compacting and sintering in the conventional manner to form the desired dense ceramic article.

Preferably, the particles are formed by atomization, such as by the use of an inert gas, to form substantially spherical particles.

In the production of zirconia ceramics, the compound containing zirconium may be one of the soluble compounds zirconium chloride, zirconium nitrate, zirconium oxynitrate or zirconium oxychloride. The precipitate is zirconium hydroxide which during calcining is converted to zirconium oxide (zirconia).

During calcining the particles are heated for a time at temperature to crystallize the zirconium oxide to a submicron crystal size. Specifically, the calcining is conducted at a temperature of 500° to 1000° C. for 1 to 24 hours. Since the particles are of a homogeneous chemical composition with a mean crystal size not greater than 300 Å with the powder particle size being not greater than about 5 microns, shorter than conventional times at temperature may be employed during the calcining operation to thereby maintain a finer than conventional crystal size with respect to the powder. This is also the case with respect to subsequent sintering wherein the fine particle and crystal size and the chemical homogeneity of the particles permit shorter sintering times to achieve complete densification and thus it is possible to maintain during both calcining and subsequent sintering a desirable substantially homogeneous, tetragonal metastable crystalline phase having less than 10 volume percent monoclinic crystalline phase. Specifically, it has been determined that the article may be sintered within the temperature range of 1400°–1600° C. for periods of five minutes to 4 hours.

During particle formation from the precipitate it is preferred that the particles be substantially spherical. This also facilitates sintering by allowing shorter sintering times at temperature.

The ceramic article comprise substantially spherical particles which are compacted and sintered to a density greater than 90 percent of theoretical density with a substantially uniform chemical composition and a substantially inclusion-free, homogeneous microstructure. The size and spherical configuration of the particles contribute to achieving the high density which may be as high as 99 percent of theoretical density. In the broader aspects of the invention, the particle crystal size may be within the range of 0.1 to less than 100 microns, but preferably the heating times and specifically the sintering times at temperature should be restricted to achieve a submicron grain size in the final ceramic article. In the production of ceramic articles including zirconia ceramic articles the article may typically include 1 to 8 percent by weight of yttrium oxide. This is achieved in accordance with the method of the invention by providing a second soluble compound containing yttrium to result in precipitation of yttrium hydroxide. It is evident, therefore, that the invention may be used to provide multiphase ceramic articles, specifically articles containing zirconium oxide and yttrium oxide.

By achieving the desired ceramic composition through chemical reaction to form a precipitate in the form of a hydrophilic colloid in accordance with the method of the invention, it is possible to avoid the conventional practices of comminuting and blending of ceramic particles, as by ball milling, which results in the introduction of inclusions and non-uniformity with respect to the chemical composition. In addition, the particles so produced conventionally are of angular, rather than spherical, configuration which requires long times at temperature to achieve densification.

The precipitate achieved in accordance with the invention may be formed into the desired spherical particles by spray atomization. In this operation the precipitate is atomized by an inert gas stream and the resulting atomized particles of the precipitate are collected, prior to solidification and agglomeration thereof, in a cryogenic liquid, such as liquid nitrogen. In this manner, the particles are rapidly quenched and solidified without agglomeration. The solidified particles which are coated with the quenching medium are then placed in a vacuum chamber which is refrigerated to maintain the particles and adhered cooling medium at or below the freezing temperature thereof. The particles are then heated in the vacuum chamber and the resulting water vapor is condensed for removal with the particles being maintained out-of-contact and with the spherical shape thereof being maintained.

A sonic sifter is then used to compress the particles to increase the particle density and reduce the particle size. Although any conventional apparatus of this type may be used, one suitable embodiment is model number L3P manufactured by ATM Corporation. The sonic sifter conventionally includes a series of vertically spaced-apart sieves through which the particles pass and are collected in accordance with the size distribution thereof upon application of sound waves which serve to compress the particles.

During the calcining operation the hydrated water is removed from the particles to convert the hydroxides to the final desired oxide constituents. In addition, the microstructure of the particles is changed from an amorphous to a finely crystalline structure. The amorphous structure is achieved by the combination of atomization and rapid cooling of the particles to prevent crystallization. The fine crystal structure, as discussed above, permits controlled growth of the crystal structure during subsequent sintering to achieve a desirable fine grain size which may be within submicron limits. In addition, since densification may be achieved by a shorter sintering cycle, sintering may be controlled to produce a desirable metastable, tetragonal crystal structure which may have no greater than 10 volume percent monoclinic phase. It has been determined that the presence of the metastable, tetragonal crystal structure is beneficial from the standpoint of providing ceramic articles that are highly resistant to crack propagation. Specifically, crack propagation is minimized in accordance with the present invention by a combination of fine crystalline size and a metastable, tetragonal crystal structure. This is demonstrated by the following specific example of the invention.

DETAILED DESCRIPTION OF THE PREFERRED EMBODIMENTS

Reference will now be made in detail to presently preferred embodiments of the invention, examples of which are described below. In the examples and throughout the specification and claims, all parts and percentages are in mole percent unless otherwise specified.

EXAMPLE

Sintered disks were made from zirconia compositions including 2 m/o, 3 m/o, and 4 m/o $Y_2O_3$. Powders for the disks were prepared in 10 gram batches by starting with $Zr(NO_3)_4$ $5H_2O$ from Johnson Matthey (Lot S92910) and $Y(NO_3)_3$ $5H_2O$ from Rare Earth Products (Lot R2754). Pre-weighed amounts of zirconium nitrate and yttrium nitrate powders in the ratios given in Table 1 were dissolved into 500 ml portions of deionized water. Separately, a basic solution was prepared by adding $NH_4OH$ to deionized water. The pH of the basic solution was adjusted to 10.0. A hydrophilic colloid of $(Zr,Y)(OH)_n \cdot X\ H_2O$ wherein n is greater than 2 and X is greater than 1 then precipitated by slowly adding the (Zr,Y) nitrate solution to the base. The precipitate was allowed to settle overnight, and the supernatant fluid removed the following day. The pH of the colloid at this stage was 9.5. This was then adjusted to 7.0 by repeated washing. The washing was accomplished by adding warm deionized water to the precipitate, followed by centrifugation to separate the colloid from the excess liquid. After the pH was adjusted, the colloid was then diluted using a 3:1 ratio of warm water to reduce the viscosity for spraying. Employing an air atomization nozzle pressurized by $N_2$ gas to a pressure of 40 psi, the colloid was then sprayed into an insulated container of liquid $N_2$ to create particles consisting of the $(Zr,Y)(OH)_n \cdot X\ H_2O$ precipitate and frozen water. The air atomization nozzle was a Spraying System nozzle 1/4JCOSS, made by Spraying System Co., Weaton, Ill. The frozen water surrounding the $(Zr,Y)(OH)_n \cdot X\ H_2O$ precipitate was then removed by freeze-drying. Freeze-drying was carried out using a Virtis Freeze Dryer model console 12, made by Virtis Co., Gardner, N.Y. The drying chamber was first pre-cooled to a temperature of $-40°$ C. The slurry of frozen particles and liquid $N_2$ was transferred into the drying chamber, and the chamber evacuated to a pressure of 30 microns of mercury. The chamber was then slowly heated to 65° C. in order to remove the frozen water by sublimation. The resulting product consisted of a highly friable white powder having a composition of $(Zr,Y)(OH)_n \cdot X\ H_2O$ which was amorphous as determined by x-ray diffraction. The mean powder particle size was found by scanning electron microscopy to be approximately 20 microns. The powder particle size was then further refined by acoustic agitation. This was achieved by passing the powder through a column of sieves using sound vibrations in a sonic sifter. The sonic sifter was model L3P, made by ATM Corporation. The final mean powder particle size was less than 1 micron. Structural water in the $(Zr,Y)(OH)_n \cdot H_2O$ particles was then removed by calcination in air at a temperature of 800° C. for 6 hours The calcination was carried out in a Lindberg box furnace, model 51314, made by Lindberg Co., Watertown, Wis. Microprobe and x-ray diffraction analyses showed that the powder at this stage had converted to (Zr,Y)O$_2$, with the compositions given in Table 1.

TABLE 1

| Composition | Nitrate Concentration grams/500 ml H$_2$O | | Firing Time 1494° C. | Density | | Grain Size (micron) | Monoclinic Phase Content (volume %) |
| --- | --- | --- | --- | --- | --- | --- | --- |
| | Zr(NO$_3$)$_4$. 5 H$_2$O | Y(NO$_3$)$_3$. 5 H$_2$O | | grams/cc | % theoretical | | |
| ZrO$_2$: 2 m/o Y$_2$O$_3$ | 33.6 | 19.7 | 0.5 | 5.96 | 98 | 0.4 | not detected |
| ZrO$_2$: 2 m/o Y$_2$O$_3$ | 33.6 | 19.7 | 1.0 | 6.01 | 99 | 0.3 | not detected |
| ZrO$_2$: 2 m/o Y$_2$O$_3$ | 33.6 | 19.7 | 2.0 | 6.02 | 99 | 0.6 | not detected |
| ZrO$_2$: 2 m/o Y$_2$O$_3$ | 33.6 | 19.7 | 3.0 | 6.02 | 99 | 0.7 | not detected |
| ZrO$_2$: 2 m/o Y$_2$O$_3$ | 33.6 | 19.7 | 4.5 | 6.03 | 99 | 0.7 | not detected |
| ZrO$_2$: 2 m/o Y$_2$O$_3$ | 33.6 | 19.7 | 6.0 | 6.01 | 99 | 0.8 | not detected |
| ZrO$_2$: 2 m/o Y$_2$O$_3$ | 33.6 | 19.7 | 8.0 | 6.01 | 99 | 0.7 | not detected |
| ZrO$_2$: 2 m/o Y$_2$O$_3$ | 33.6 | 19.7 | 12.5 | 6.01 | 99 | 0.9 | not detected |
| ZrO$_2$: 2 m/o Y$_2$O$_3$ | 33.6 | 19.7 | 18.0 | 5.83 | 96 | 1.0 | 42% |
| ZrO$_2$: 2 m/o Y$_2$O$_3$ | 33.6 | 19.7 | 24.0 | 5.81 | 96 | 1.2 | 62% |
| ZrO$_2$: 3 m/o Y$_2$O$_3$ | 33.0 | 29.5 | 1.0 | 6.03 | 99 | 0.4 | not detected |
| ZrO$_2$: 3 m/o Y$_2$O$_3$ | 33.0 | 29.5 | 1.0 | 5.97 | 98 | — | not detected |
| ZrO$_2$: 3 m/o Y$_2$O$_3$ | 33.0 | 29.5 | 1.0 | 6.01 | 99 | — | not detected |
| ZrO$_2$: 3 m/o Y$_2$O$_3$ | 33.0 | 29.5 | 1.0 | 5.96 | 98 | — | not detected |
| ZrO$_2$: 3 m/o Y$_2$O$_3$ | 33.0 | 29.5 | 1.0 | 5.96 | 98 | — | not detected |
| ZrO$_2$: 3 m/o Y$_2$O$_3$ | 33.0 | 29.5 | 1.0 | 5.96 | 98 | — | not detected |
| ZrO$_2$: 3 m/o Y$_2$O$_3$ | 33.0 | 29.5 | 1.0 | 5.96 | 98 | — | not detected |
| ZrO$_2$: 3 m/o Y$_2$O$_3$ | 33.0 | 29.5 | 1.0 | 5.97 | 98 | — | not detected |
| ZrO$_2$: 3 m/o Y$_2$O$_3$ | 33.0 | 29.5 | 1.0 | 5.98 | 99 | — | not detected |
| ZrO$_2$: 3 m/o Y$_2$O$_3$ | 33.0 | 29.5 | 1.0 | 5.95 | 98 | — | not detected |
| ZrO$_2$: 4 m/o Y$_2$O$_3$ | 32.3 | 38.8 | 1.0 | 5.95 | 98 | 0.4 | not detected |
| ZrO$_2$: 4 m/o Y$_2$O$_3$ | 32.3 | 38.8 | 1.0 | 5.96 | 98 | — | not detected |
| ZrO$_2$: 4 m/o Y$_2$O$_3$ | 32.3 | 38.8 | 1.0 | 5.94 | 98 | — | not detected |
| ZrO$_2$: 4 m/o Y$_2$O$_3$ | 32.3 | 38.8 | 1.0 | 5.95 | 98 | — | not detected |
| ZrO$_2$: 4 m/o Y$_2$O$_3$ | 32.3 | 38.8 | 1.0 | 5.94 | 98 | — | not detected |
| ZrO$_2$: 4 m/o Y$_2$O$_3$ | 32.3 | 38.8 | 1.0 | 5.95 | 98 | — | not detected |
| ZrO$_2$: 4 m/o Y$_2$O$_3$ | 32.3 | 38.8 | 1.0 | 5.95 | 98 | — | not detected |
| ZrO$_2$: 4 m/o Y$_2$O$_3$ | 32.3 | 38.8 | 1.0 | 5.94 | 98 | — | not detected |
| ZrO$_2$: 4 m/o Y$_2$O$_3$ | 32.3 | 38.8 | 1.0 | 5.95 | 98 | — | not detected |

SEM and x-ray diffraction analyses further showed that the powder consisted of sub-micron particles containing crystallites of approximately 300 Å A in size.

TABLE 2

| Composition | Fracture Toughness (MPA $\sqrt{m}$) |
| --- | --- |
| ZrO$_2$: 2 m/o Y$_2$O$_3$ | 8.6 |
| ZrO$_2$: 2 m/o Y$_2$O$_3$ | 10.1 |
| ZrO$_2$: 2 m/o Y$_2$O$_3$ | 10.4 |
| ZrO$_2$: 2 m/o Y$_2$O$_3$ | 11.0 |
| ZrO$_2$: 2 m/o Y$_2$O$_3$ | 11.0 |
| ZrO$_2$: 3 m/o Y$_2$O$_3$ | 11.5 |
| ZrO$_2$: 3 m/o Y$_2$O$_3$ | 11.6 |
| ZrO$_2$: 4 m/o Y$_2$O$_3$ | 9.4 |
| ZrO$_2$: 4 m/o Y$_2$O$_3$ | 8.1 |

From each batch, 3.5 grams of powder was then consolidated into disk shape by pressing in a double acting die at 1591 psi. The die employed was Buehler model 20-2120, made by Buehler Ltd., Evanston, Ill. The disk were then fired at 1494° C. for the times listed in Table 1, employing the Lindberg furnace.

The fired disks were characterized with respect to density, phase content, and grain size. Density was measured by the pycnometric method, employing deionized water as the reference fluid. Measurements were carried out on a Mettler balance, model AE100 made by the Mettler Co., Hightstown, N.J. All densities were found to be greater than 96% of theoretical, and typically 98-99% of theoretical. The phase content was analyzed by x-ray diffraction. X-ray diffraction scans were performed on a Rigaku DMAX II-A unit, made by Rigaku Denki, Japan. The ratio of the monoclinic (111) diffraction line (strongest monoclinic peak) to the tetragonal (200) diffraction line (strongest tetragonal peak) was used to determine the relative concentration of these phases. All samples were found to consist of the tetragonal metastable phase, except for those which were fired for times greater than 12 hours. The grain size was measured by transmission electron microscopy. The instrument employed was a Phillips 400, made by Phillips Co , Netherlands. All grain sizes were found to be sub-micron except for samples fired for times greater than 12 hours. The fracture toughness for additional disks of each composition sintered for 1 hour at 1494° C. was also measured, using the method of diametral compression. Measurements were carried out on an MTS 20,000 lb hydraulic load frame, made by Mechanical Testing Systems Co , Minneapolis, Minn. These data are reported in Table 2.

A comparison of the fracture toughness and phase content of the chemically prepared disks to conventional mechanically prepared disks are given in Table 3. The mechanically prepared disks were made in accordance with the teachings of U.S. Pat. No. 4,360,598. The chemically prepared disk showed no evidence of monoclinic phase formation. Furthermore, comparison of the mechanical properties shows that in accordance with the invention the chemically prepared disks have superior fracture toughness.

TABLE 3

| | Mechanically Prepared | | Chemically Prepared | |
|---|---|---|---|---|
| | Monoclinic Phase Content (volume percent) | Fracture Toughness (MPA $\sqrt{m}$) | Monoclinic Phase Content (volume percent) | Fracture Toughness (MPA $\sqrt{m}$) |
| $ZrO_2$: 2 m/o $Y_2O_3$ | 16% | 8.7 | 0 | 10.2 |
| $ZrO_2$: 3 m/o $Y_2O_3$ | 7% | 7.0 | 0 | 11.6 |
| $ZrO_2$: 4 m/o $Y_2O_3$ | 16% | 4.5 | 0 | 8.7 |

What is claimed is:

1. A method for producing a metallic oxide ceramic article having good fracture toughness, said method comprising forming a solution of a metal compound whose oxide is present in said metal oxide ceramic article, precipitating said metal from said solution in the form of a hydrophilic colloid of a hydroxide of said metal, forming spherical particles by spray atomization of a slurry of said colloid into a cryogenic liquid, calcining said particles to convert said metal hydroxide to a ceramic oxide and compacting and sintering said calcined particles to form a ceramic article having good fracture toughness.

2. The method of claim 1 wherein said metal compound is selected from the group consisting of the nitrates, chlorides, oxynitrates and oxychlorides of said metal.

3. The method of claim 1 or claim 2 wherein said metal is selected from the group consisting of zirconium, aluminum magnesium and yttrium.

4. The method of claim 3 wherein said precipitation is effected with an alkali metal hydroxide or ammonium hydroxide.

5. The method of claim 4 wherein said cryogenic liquid is liquid nitrogen.

6. The method of claim 4 wherein said solution is an aqueous solution.

7. A method for producing a ceramic article having good fracture toughness, said method comprising forming a solution of at least one compound of a metal selected from the group consisting of zirconium, aluminum, magnesium and yttrium, precipitating said metal from said solution in the form of a hydrophilic colloid of a hydroxide of said metal, forming a slurry of said colloid, spray atomizing said slurry into a cryogenic quenching medium to form and rapidly solidify particles of said colloid, drying said particles, compressing said particles to increase the density and reduce the size thereof, calcining said particles to convert said metal hydroxide to a ceramic oxide and compacting and sintering said calcined particles to form a ceramic article having good fracture toughness.

8. The method of claim 7 wherein during said calcining said particles are heated for a time and at a temperature effective to crystallize said ceramic oxide to a submicron crystal size.

9. The method of claim 8 wherein said calcining is conducted at a temperature of 500° to 1000° C. for 1 to 24 hours.

10. The method of claim 9 wherein said article is sintered for a time at temperature to produce a substantially homogenous tetragonal metastable crystalline phase with less than 10 volume percent monoclinic crystalline phase.

11. The method of claim 10 wherein said article is sintered within the temperature range of 1400°-1600° C. for 5 minutes to 4 hours.

12. The method of claim 7 wherein said slurry is formed by suspended said colloid in water.

13. A method for producing a ceramic article having good fracture toughness, said method comprising dissolving a water-soluble compound containing zirconium to form a solution, effecting precipitation of a hydrophilic colloid of zirconium hydroxide from said solution by combining therewith an alkali metal hydroxide or ammonium hydroxide whereby an aqueous slurry is formed, spray atomizing said aqueous slurry into a cryogenic quenching medium to form spherical particles from said colloid, drying said particles, compressing aid particles to increase the density and reduce the size thereof, calcining said particles to convert said zirconium hydroxide to zirconium oxide and compacting and sintering said calcined particles to form a dense ceramic article having good fracture toughness.

14. The method of claim 13 wherein said zirconium containing compound is selected from the group consisting of zirconium chloride, zirconium nitrate, zirconium oxynitrate and zirconium oxychloride.

15. The method of claim 14 wherein during said calcining said particles are heated for a time and at a temperature effective to crystallize said zirconium oxide to a submicron crystal size.

16. The method of claim 15 wherein said calcining is conducted at a temperature of 500 to 1000° C. for 1 to 24 hours.

17. The method of claim 16 wherein said article is sintered for time at temperature to produce a substantially homogenous tetragonal metastable crystalline phase with less than 10 volume percent monoclinic crystalline phase.

18. The method of claim 17 wherein said article is sintered within the temperature range of 1400°-1600° C. for 5 minutes to 4 hours.

19. The method of claim 13 including dissolving a water-soluble compound of yttrium in water with said water-soluble compound containing zirconium.

* * * * *